United States Patent [19]
Bang et al.

[11] Patent Number: 5,715,325
[45] Date of Patent: Feb. 3, 1998

[54] APPARATUS AND METHOD FOR DETECTING A FACE IN A VIDEO IMAGE

[75] Inventors: Richard D. Bang, Princeton; Ming Fang, Cranbury; Stuart C. Schwartz, Princeton; Keith M. Andress, Plainsboro, all of N.J.

[73] Assignees: Siemens Corporate Research, Inc.; The Trustees of Princeton University, both of Princeton, N.J.

[21] Appl. No.: 521,175

[22] Filed: Aug. 30, 1995

[51] Int. Cl.$^6$ .................................................. G06K 9/00
[52] U.S. Cl. ........................... 382/118; 382/290; 382/274; 382/276
[58] Field of Search .................. 382/115–118, 155–156, 382/209, 199, 190, 276, 282, 254, 274–275; 340/825.34

[56] References Cited

U.S. PATENT DOCUMENTS

| | | | |
|---|---|---|---|
| 5,012,522 | 4/1991 | Lambert | 382/115 |
| 5,432,864 | 7/1995 | Lu et al. | 382/118 |
| 5,497,430 | 3/1996 | Sadovnik et al. | 382/156 |
| 5,561,718 | 10/1996 | Trew et al. | 382/118 |

OTHER PUBLICATIONS

Brunelli et al, "Face Recognition : Features versus templates", IEEE Transactions on Pattern Analysis & Machine Int elligence, vol. 15, No. 10; Oct. 1993.

Gunn et al, "A dual active contour for head boundary extraction", IEE Colloq. No. 100.1994.

*Primary Examiner*—Leo Boudreau
*Assistant Examiner*—Bhavesh Mehta
*Attorney, Agent, or Firm*—Donald B. Paschburg

[57] ABSTRACT

A detection system identifies a person by rapidly analyzing an image frame from a video camera for the presence of a face by reducing the image in resolution and normalizing the image to compensate for lighting changes and compares the normalized image with a background image to produce a binary interest mask. The most likely position of a face is then determined by identifying a top, bottom and sides of a possible head region to define a bounding box, normalizing the pixel data within the bounding box to further compensate for lighting variations, and resizing the box to match identification templates stored in memory. The best match from the identification templates is provided with a score indicative of the degree of the match. If the score does not exceed a first score threshold, then no face is assumed present. If the score exceeds a first and second score threshold, then a face is assumed present. If the first score threshold is exceeded but the second is not, a further eye location procedure is performed on the data to determine if a face is present.

12 Claims, 4 Drawing Sheets

APPARATUS AND METHOD FOR DETECTING A FACE IN A VIDEO IMAGE

RELATED APPLICATIONS

The present invention disclosure is related to concurrently filed co-pending U.S. patent application No. 08/521,176, filed Aug. 30, 1995, entitled NEURAL NETWORK FOR LOCATING AND RECOGNIZING A DEFORMABLE OBJECT, by Kung et al., and assigned to Siemens Corp., the assignee herein. The above referenced application is herein incorporated into this disclosure by reference.

BACKGROUND OF THE INVENTION

1. Field of the Invention

The present invention relates to video based identification systems that are capable of automatically detecting the presence of a person's face in a video image. More particularly, the present invention relates to devices and methods that use iterative computations to first rapidly identify the presence of a face in a video image and then match the face to a stored identification template.

2. Description of the Prior Art

Technologies exist in the prior art for locating faces in a complex scene. Many techniques, such as that exemplified in an article entitled "Finding Faces in Cluttered Scenes using Random Labeled Graph Matching" by Chen et al., IEEE (0-8186-7042-8/95) pp.637–644, use sophisticated algorithms that are time consuming to run. As a result, such complex algorithm-based techniques are not readily adaptable to identification systems that require a rapid identification of a face. To address applications that do require a rapid reaction time, less sophisticated and therefore less time consuming algorithms have been developed. However, in order to make such prior art techniques less sophisticated, assumptions were made in the processing algorithm that are not true to life. For example, in prior art systems, such as those exemplified by "Face Detection by Fuzzy Pattern Matching" by Chen et al., IEEE 95 (0-8186-7042-9/95) pp. 591–596; "Face Detection Using Templates," by Known et al., IEEE 94 (1051-4651/94) pp. 764-767; and "Human Face Detection in a Complex Background" by Yang et al., Pattern Recognition, Vol. 27, No. 1, pp.53–63, 1994, the processing algorithms unrealistically search for, or depend on, dark hair or a dark background surrounding a light skinned face. Some of these prior art techniques also require a color camera to facilitate face/background segmentation, while others assume the face being searched will have Asian characteristics. Such assumptions are not always true to life, and therefore result in an identification system that has only limited abilities.

One of the largest disadvantages of many prior art face identification systems and methods, is that the processing algorithms used by these systems assume that the face being identified will have constant illumination during the course of the identification procedure. This assumption also is not true to life. In the real world, illumination is constantly changing. The sun passes behind clouds, lights are turned on and off, doors from brightly lit rooms open and close, automobile headlights pass and the like. In many prior art face identification systems, if the illumination changes, the processing algorithm assumes that the features of the face have changed or moved, thereby resulting in false or inconsistent results.

It is therefore an objective of the present invention to provide a face identification system and method that provides a rapid identification to a face, regardless to the skin color, hair color or other color related variables.

It is a further object of the present invention to provide a face identification system that is reliably operational in a real life application, where there are continuous changes in illumination that may be reflected in the face being identified.

SUMMARY OF THE INVENTION

The present invention is an identification system and method for identifying the presence of a human face in a video image. In this system, a video camera is used to view a scene. As a person enters the scene being viewed, an image frame is rapidly analyzed for the presence of a face. During the analysis of the image frame, the image is reduced in resolution and normalization to compensate for changes in lighting. The modified image frame is then compared to a previously configured background image to produce a binary interest mask. Utilizing the binary interest mask, the most likely position of a face is computed by identifying the top, bottom and sides of any possible head region in the modified interest mask. The identified head region is defined within a bounding box, wherein the size and characteristics of the bounding box are analyzed for the possibility of a face. Once it has been determined that the bounding box may include a face, the data contained within the bounding box is further analyzed.

In the analysis of the bounding box data, the data is again normalized to compensate for changes in lighting. The bounding box is also resized to a selected standard size that matches identification templates held in memory. Once matched in size, the data within the bounding box is compared to various identification templates from memory. The best match from the identification templates is provided with a score that is indicative to the degree of the match. If the score does not exceed a predetermined score, no face is assumed to be present in the original image frame. Adversely, if the score does exceed a second predetermined threshold, a face is assumed to have been identified. In a circumstance where a score is not below the first threshold score but not above the second threshold score, a further eye location procedure is performed on the data of the bounding box. If an eye is located, a face is assumed to be present. If no eye is located, no face is assumed and a subsequent image frame is analyzed.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Figure 1:
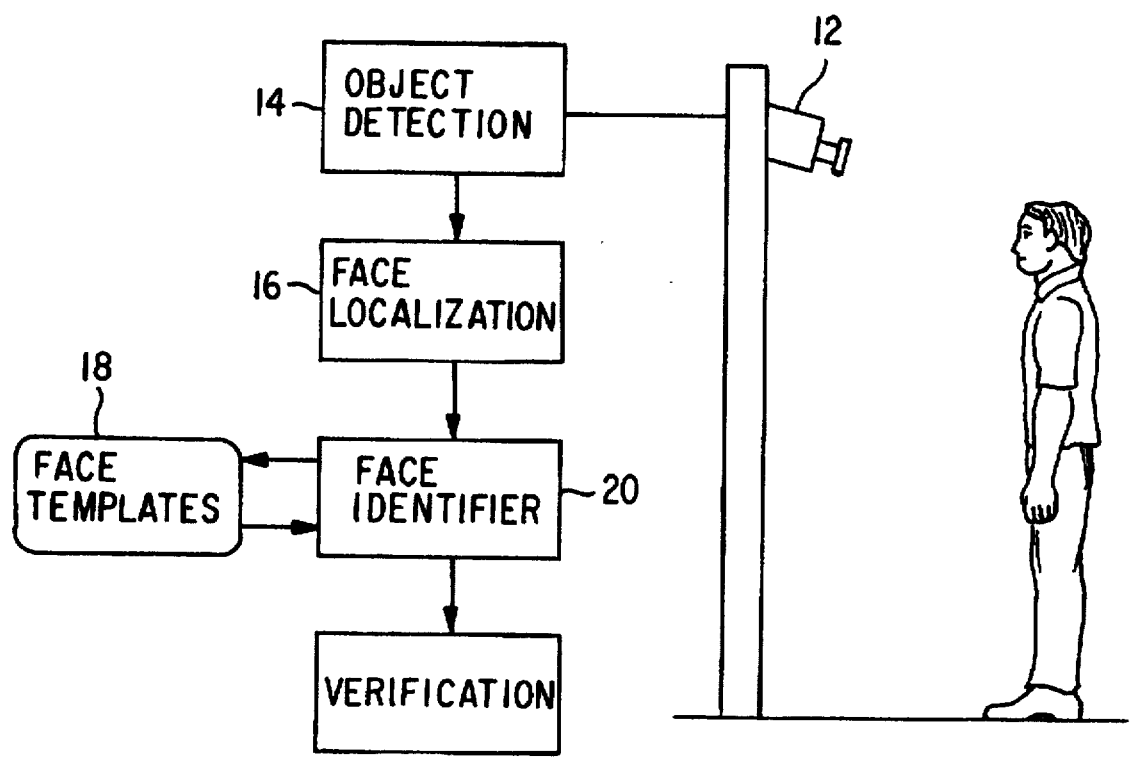
FIG. 1 is a general block diagram schematic illustrating the overall structure of one preferred embodiment of the present invention identification system.

The present invention is a system and method for detecting a face in a video image and identifying the face by matching the face to a template held in memory. The present invention can be used in any system where a person's identity needs to be verified, such as at an ATM machine, or in any automated system where the recognition of a the presence of a face would prove useful. Referring to FIG. 1, it can be seen that the present invention face identification system and method uses a video camera 12 coupled to an image processor. As will later be explained, the image processor analyzes the images received from the video camera 12 in a three step procedure. First, the video image is analyzed for the presence of a person in an object detection subtask, shown by block 14. If a person is present, the face of the person in the video image is isolated in a face localization subtask, shown by block 16. The isolated face is then digitally compared to various face templates 18 contained within a stored memory in a face identification subtask, shown by block 20. The face identification subtask first rapidly performs a coarse face identification to improve processing time. A more complex face identification process is performed only if the results of the coarse face identification process were inconclusive. By reducing the task of identifying a face into three primary subtasks, a face identification system and method is provided that is capable of rapidly and accurately identifying a face.

Figure 2:
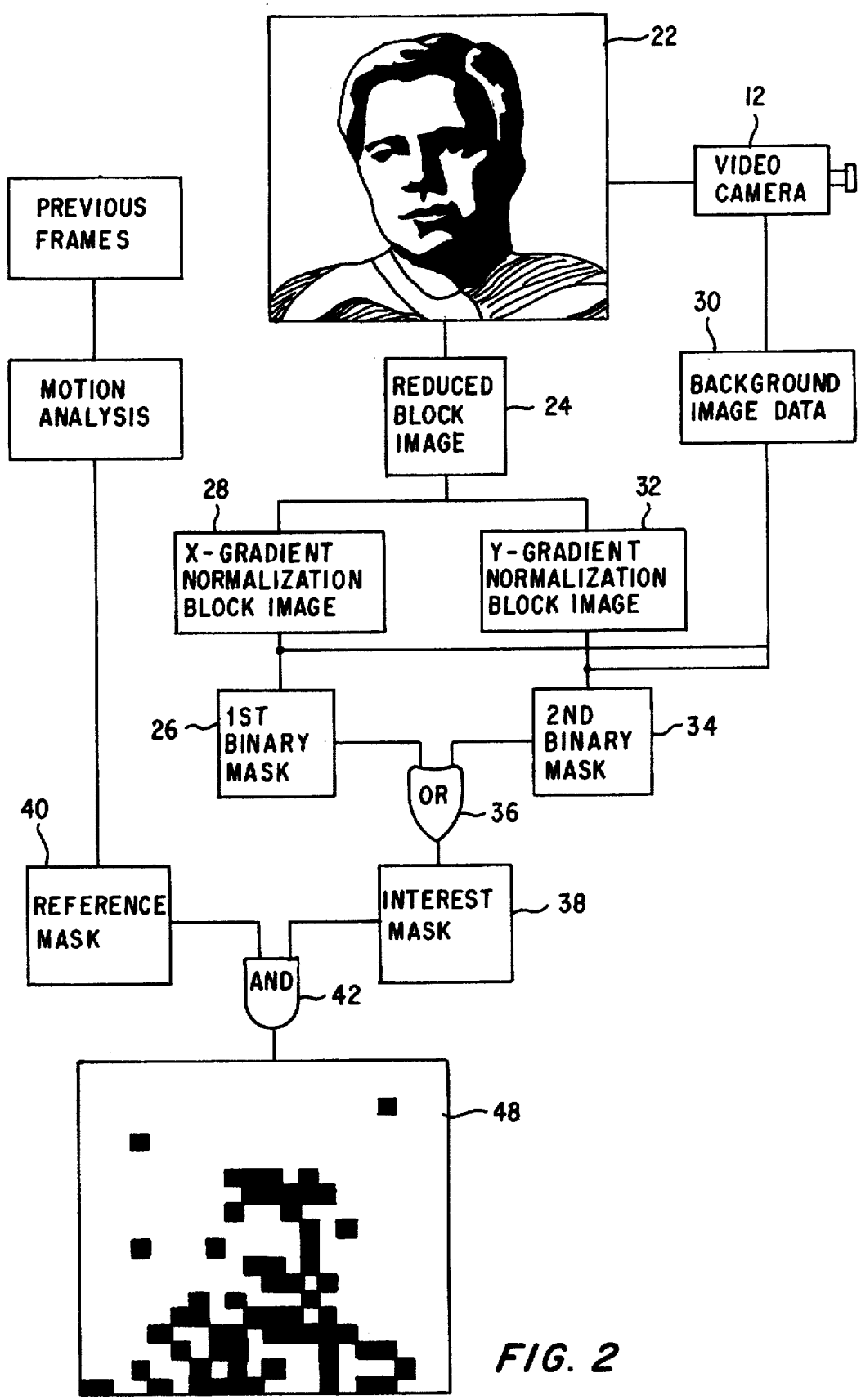
FIG. 2 is a block diagram schematic illustrating the method steps of creating a binary interest mask from an image frame obtained from a video camera.

The first step of rapid object detection, as expressed by block 14 in FIG. 1, is explained in detail with reference to FIG. 2. In FIG. 2, it can be seen that video camera 12 produces an image data 22. In the preferred embodiment, the video camera 12 need only be a black and white camera that produces an image having a moderate resolution of approximately 320×240 (width×height). For reasons of increasing computational speed, the initial image data 22 is downsized to a block image 24 of a much smaller resolution. The production of the block image 24 is created by averaging pixel blocks contained within the initial image data 22. In the preferred embodiment 8×8 pixel blocks are averaged, producing a block image 24 with a resolution of 40×30 from the original 320×240 image data 22. Block averaging is used in the production of the block image 24 rather than straight subsampling because of the greater noise tolerance produced by block averaging.

As the block image 24 is created, the image is normalized to minimize variations caused by changes in light. Lighting normalization is done via a normalization gradient. For the x-direction in the block image 24, the x-gradient is $$MAX \frac{I(x+1,y) - I(x,y)}{(I(x+1,y),I(x,y))} + B$$

where B is a chosen constant offset. In the preferred computations B is selected as 1 for an unsigned byte image. While the normalization gradient is not optimal for all lighting variations, the performance of the normalization gradient is adequate and its computational simplicity adds to the rapid response of the overall system. After normalization, what results is the block image 24 which has pixel blocks that can be considered either black or white, thereby providing image data that is easily represented in binary.

The present invention system utilizes a fixed video camera 12. Since the video camera 12 is fixed, the background image data 30 obtained by the video camera remains relatively constant. The background image data 30 is converted into a block image of dark and light pixel blocks and is digitally stored as a binary sequence. As a person enters the range of the video camera 12, the image frame deviates from the expected background image. A binary mask 26 is produced by comparing the x-gradient normalized block image data 28 for a given frame to the expected background image data 30. If a location in the sampled frame exceeds a threshold level change, the value in the binary mask 26 for that location is set at one (1). If a location within the sample frame does not change from the stored background image or fails to exceed the threshold level of change, the location within the binary mask 26 remains unset at zero (0).

Although a frame comparison using a x-gradient normalization block image is sufficient, detection performance is improved by analyzing more than just the x-gradient. For improved performance, a second set of block image data can be produced utilizing a y-direction gradient. For the y-direction, the y-gradient is $$MAX \frac{I(y+1,x) - I(y,x)}{(I(y+1,x),I(y,x))} + B$$

Once the y-gradient normalized block image data 32 is calculated, a second binary mask 34 is created by comparing the y-gradient normalized block image data 32 to the background image data 30. If a location in the sampled frame exceeds a threshold level change, the value in the second binary mask 34 for that location is set at one (1). If a location within the sample frame does not change from the stored background image or fails to exceed the threshold level of change, the location within the second binary mask 34 remains unset at zero (0).

After the calculation of the first binary mask 26 and the second binary mask 34, a bit by bit "OR" comparison 36 is performed between the data contained within the two binary masks 26, 34. As a result of the "OR" comparison, an interest mask 38 is produced that contains data normalized for by both the x-gradient and the y-gradient. Because the interest mask 38 is obtained from the comparison of two normalized images, sudden changes in illumination inherently do not have a significant effect on the data within the interest mask 38.

Since the present invention system utilizes a video camera 12, subsequent frames of a viewed image can be analyzed for the occurrence of motion. Motion information can then be used to remove noise from the interest mask 38. By frame differencing, thresholding and other known video image motion detection techniques, a reference mask 40 can be derived for a particular frame sequence. The reference mask 40 is then digitally compared to the interest mask 38 utilizing an "AND" comparison 42 to produce a final interest mask 48. The "AND" comparison 42 between binary data of the reference mask 40 and the interest mask 38 typically removes noise from the interest mask 38, because most lighting changes are subtle and do not register as changes in motion from frame to frame. The "AND" comparison between the data of the reference mask 40 and the interest mask 38, also is useful for cleaning noise in the interest mask 38 created by sudden changes in lighting. A sudden change in lighting creates a large degree of change that is detected motion in a frame by frame analysis. As a result, a sudden change in lighting may produce a reference mask 40 that indicates movement at all points. By performing an "AND" comparison between such a reference mask and the interest mask 38, the resulting final interest mask would be the same as if no motion information was ever used.

Figure 3A:
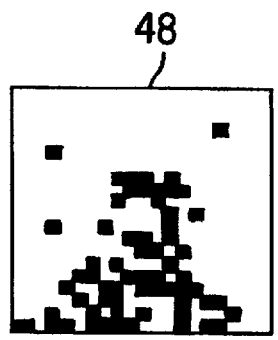
FIG. 3a shows the binary interest mask produced by the method steps contained in FIG. 2.
Figure 3B:
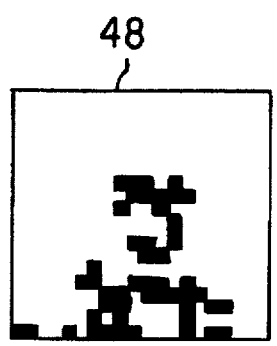
FIG. 3b shows the binary interest mask of FIG. 3a cleaned for noise.
Figure 3C:
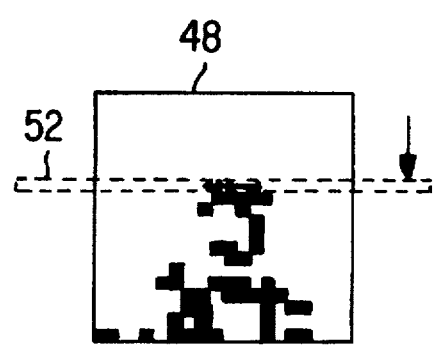
FIG. 3c shows the cleaned binary interest mask of FIG. 3b being analyzed for the top limit of a boundary box.

Referring to FIGS. 3a-3g, it can be seen that after the final interest mask 48 is produced, the final interest mask 48 is analyzed for the presence of a face. Face location is performed by first constructing a bounding box 50 (FIG. 3g) into which it is assumed the face will be located. The bounding box 50 is constructed assuming that the top and sides of the head are distinguishable features contained within the final interest mask 48. FIGS. 3a through 3g express the binary data contained within the final interest mask 48 as graphic images where dark blocks are binary ones (1's) and light blocks are binary zeros (0's). In the first step in locating a face within the final interest mask 48, the original final interest mask 48 (FIG. 3a) is cleaned by removing single isolated binary anomalies where a face is not possible. The result is a less noisy final interest mask 48 as shown by FIG. 3b.

Starting with the cleaned final interest mask 48 of FIG. 3b, the top of the bounding box 50 is then estimated by counting the number of dark blocks (binary 1's) in each row of the final interest mask. When the number of dark blocks in a row exceeds a pre-selected amount, it is assumed that row corresponds to the top of the head. As can be seen from FIG. 3c, the top line 52 of the bounding box 50 is then set at that row.

Figure 3D:
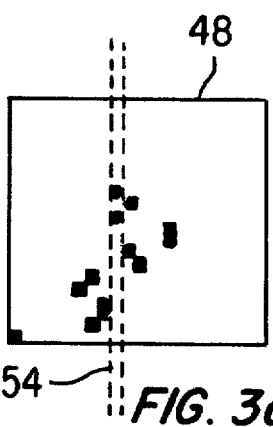
FIG. 3d and 3e show the cleaned binary interest mask being analyzed for side limits to the bounding box.
Figure 3E:
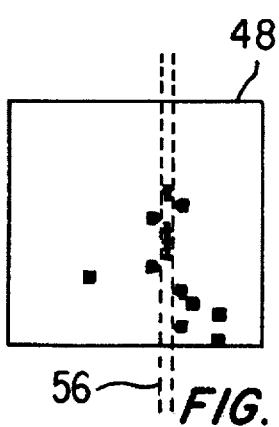

To obtain estimates of the sides of a person's head, each row below the top line 52 of the bounding box 50 is analyzed for where the various dark blocks begin and end on that row. Referring to FIGS. 3d and 3e, it can be seen that the median column location of where the dark blocks begin and end is calculated. The median location of where the dark blocks begin is designated the first side 54 (FIG. 3d) of the bounding box 50, while the medium location of where the dark blocks end is designated the opposite side 56 (FIG. 3e) of the bounding box 50.

Figure 3F:
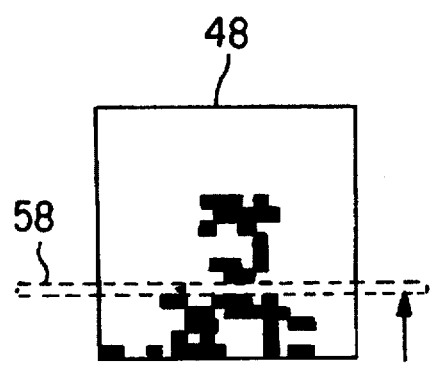
FIG. 3f shows the cleaned binary interest mask being analyzed for the bottom limit of the bounding box.
Figure 3G:
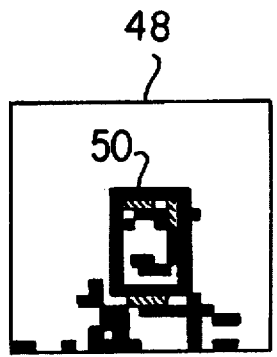
FIG. 3g shows the bounding box superimposed over the cleaned binary interest mask.

Because of the large amount of variation in the height of people, the bottom of the face within the final interest mask 48 is the most difficult to determine. Referring to FIGS. 3f and 3g, an estimate of the bottom of the face is made by finding a narrowing point on the final interest mask 48 that would correspond to the point where the head meets the shoulders. This is done by looking at the average number of dark blocks for each row in the upper half of the bounding box 50. A lower boundary 58 of the bounding box 50 is found by analyzing the row in the final interest mask 48 starting at the bottom. The lower boundary 58 of the bounding box 50 is then moved upwardly until it reaches a row where the average number of dark blocks in the row is lower than the average number of dark blocks in the rows of the top half of the bounding box 50.

Once the bounding box 50 is complete, the bounding box 50 is analyzed to see if it is adequate or if another frame of the video image should be viewed. The determination of adequacy is made based upon the width of the bounding box 50 and the number of dark blocks contained within the bounding box 50. If the bounding box is too small, too big or contains too few dark blocks, it is assumed that no face was found in the analyzed frame and a subsequent frame is analyzed.

Figure 4:
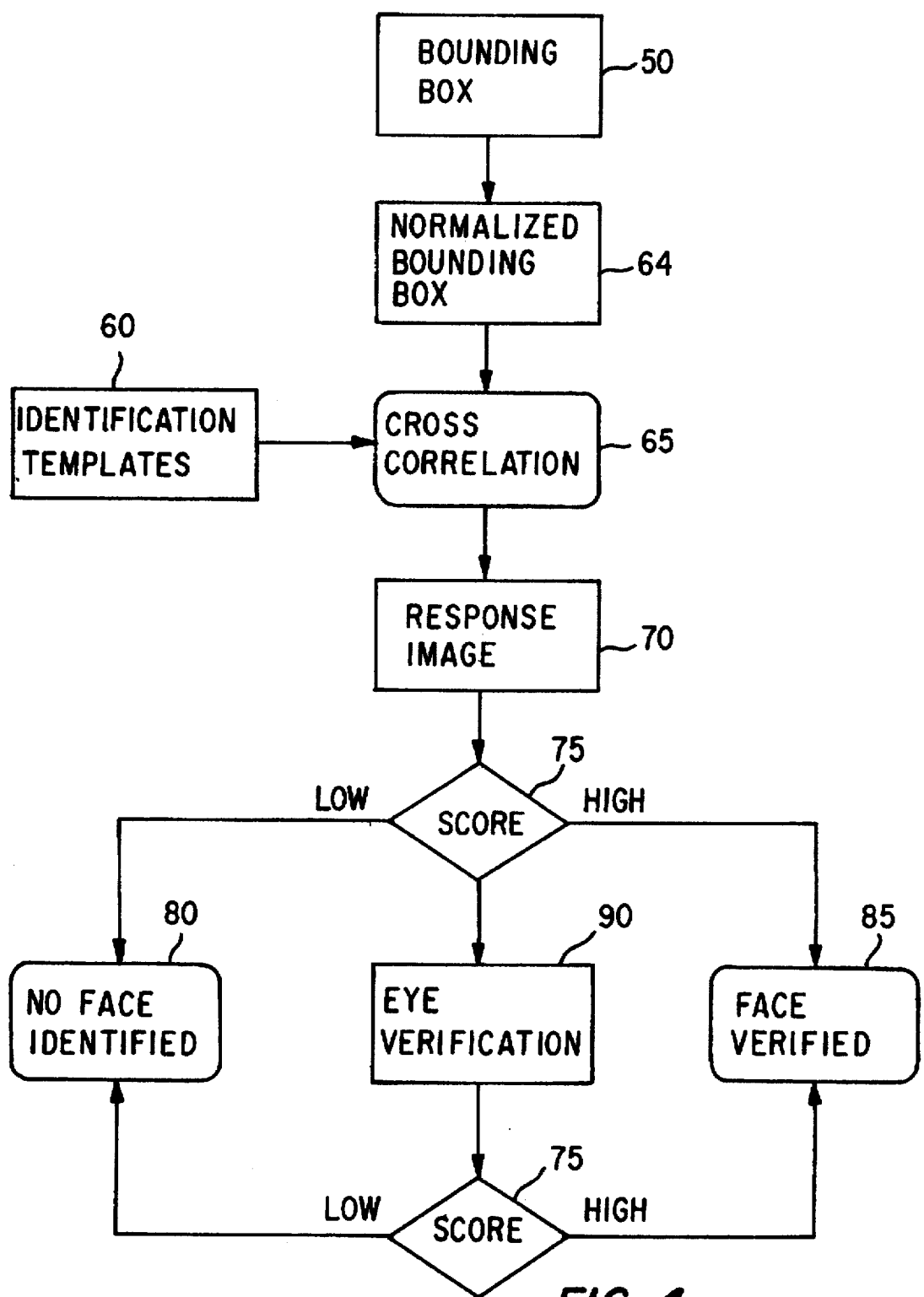
FIG. 4 shows the method of determining the existence of a face from the bounding box of an interest mask.

After the bounding box 50 is identified and the bounding box 50 has been found to meet the minimum requirements, the contents of the bounding box 50 are analyzed for coarse face detection. Referring to FIG. 4, it will be explained that the data contained within the bounding box 50 is compared to data contained within various identification templates 60 to verify the existence of a face in the bounding box 50. The comparison subtask initially searches for a match with several appropriately sized identification templates 60 in an attempt to determine if a face is even contained within the data of the bounding box 50. The comparison subtask selects the best match between the data in the bounding box 50 and the identification templates 60. The best match is output along with a confidence score that shows to what degree the identification template matched the data within the bounding box 50.

The size of the bounding box 50 is a variable that depends upon the image viewed by the video camera and how that image is interpreted by the present invention system. As a result, before the data contained within the bounding box 50 must often be resized. To compensate for variations in light, a light normalization procedure is performed on the bounding box 50, thereby producing a normalized bounding box 64. Since the data contained in the original bounding box 50 is altered from the normalization procedure, the resultant data is no longer truly binary in nature. During the normalization procedure the bounding box data is scaled to remove fine detail and provided with an enhanced contrast. In principle, the lighting normalization performed on the bounding block 50 is a variation of the normalization procedure disclosed in "A Novel Approach to Lighting Normalization" by current applicants Richard Bang, Ming Fang and others, SCR Technical Report 95-TR-543, which is herein incorporated by reference. In the SCR Technical Report there is a multi-resolution low-pass filter stage. In the present invention, the multi-resolution low-pass filter stage is stopped prior to its completion, thereby resulting in an image that remains at a low resolution. Such a modification significantly decreases the processing time associated with the procedure. Additionally, a large scaling constant is used during normalization to eliminate fine detail and provide a hard contrast, thereby providing good contrast to the bounding block data. Due to the enhanced contrast and the elimination of fine detail, the resultant normalized bounding box 64 is nearly binarized (having dark blocks and light blocks) but still contains some blocks that cannot be clearly categorized. To promote simplicity in processing, the normalized bounding box 64 is quantified as a trinary image, where dark regions are identified with negative ones (−1's), light regions are identified with ones (1's), and the undefinable regions are identified with zeros (0's).

The identification templates 60 are made from at analysis of at least one sample face. However, since the template may represent a generic face rather than a specific face, multiple sample faces are compiled to create each identification template 60. Each identification template contains a compilation of sample faces of a particular pre-chosen template size, wherein each identification template 60 is made as a trinary image. To create the trinary image that is an identification template 60, the various faces selected are digitally compared to one another. If a template position is seen to be black across nearly all example faces, then the template value is set at negative one (−1). If the template position is seen to be white across nearly all example faces, then the template value is set at one (1). However, if a position in the template seems to have no consistency across the example faces, a value of zero (0) is assigned. One way to check for this template position values is to finds the average across all example faces. If the average falls below some set threshold, the position is set at negative one (−1). Conversely, if the average is above a second threshold, the value is set at one (1). All other average values between the two thresholds are set at zero (0).

The trinary image of the normalized bounding box 64 is not correlated with the identification templates 60 in a manner that finds maximum correlation response. Overall detection performance is improved by using more information than just maximum response. Performance is improved by matching cross correction responses. This means that the normalized boundary box 64 is correlated with the identification templates 60 as shown in block 65 to obtain a response image 70. Patterns resulting in the response image 70 are then analyzed. For instance, patterns of dark-light-dark in adjacent regions of the response image 70 could be searched. The found patterns are then scored in block 75 based on the difference between the light region and the lighter of the two dark regions. By scoring the response image 70, an overall score is developed for each of the identification templates 60. All identification templates 60 that exceed a predetermined score are saved as finalists.

For each identification template 60 identified as a finalist, a symmetry score and straight correlation measure are determined. The finalist with the highest straight correlation is selected as a match unless the symmetry measure is low. If so, the straight correlation and symmetry measure are compared to those of the next most qualified finalist to decide which is the better selection. When the best identification template has a low score from block 75, it is assumed no face was present in the boundary box as shown in block 80. If the score is above a predetermined threshold, a face is assumed to have been found as shown in block 85. However, in the circumstance when a score is neither high nor low, the data from the bounding box is passed to an eye detecting procedure 90, such as that found in co-pending U.S. application No. 08/521,176, entitled NEUTRAL NETWORK FOR LOCATING AND RECOGNIZING A DEFORMABLE OBJECT, which has been incorporated by reference. If no eyes are detected (that is, the score in block 75 is low), no face is assumed to be present.

It will be understood that the embodiment of the present invention face detection system illustrated and described above is merely exemplary and many variations and modifications can be made by using functionally equivalent components and/or alternate embodiments. For instance, it will be understood by a person skilled in the art that different reduction sizes for the sampled image could be used. All such variations and modifications are intended to be included within the scope of the invention as defined by the appended claims.

What is claimed is:

1. An identification system for identifying a face comprising:
   a video camera for viewing a scene and providing at least one image frame of said scene;
   locating means for locating a target region in said image frame that is capable of containing an image of said face;
   memory means for storing identification templates of faces;
   comparison means for comparing said target region to said identification templates, whereby a face is identified when said image in said target region substantially matches one of said identification templates, wherein said locating means comprises means for identifying an upper boundary of said target region by comparing pixel blocks contained in rows of said image frame with a threshold number value, means for identifying side boundaries of said target region by determining a medium position of pixel blocks contained within rows of said image frame, and means for identifying a lower boundary of said target region by averaging the numbers of pixel blocks contained in each row within said target region and identifying a row with a number of pixel blocks below average.

2. The system according to claim 1, further comprising a means for distinguishing the outline of a person in said scene, wherein said target region includes the head of the person in said scene.

3. The system according to claim 1, further comprising a means for normalizing said at least one image frame for changes in lighting.

4. A method for identifying a face, comprising the steps of:
   producing an image of a scene with a predetermined resolution of pixels;
   distinguishing an outline of a person in said scene comprising the steps of:
      reducing said predetermined resolution of said image;
      normalizing said reduced resolution image with an x-gradient to produce a normalized image insensitive to illumination variations;
      applying background image data to said normalized image to produce a normalized image mask;
      generating a reference mask from the motion analysis of consecutive images of said object;
      comparing said reference mask to said normalized image to remove noise from said normalized image and produce a final interest image indicative of said outline and insensitive to light changes;
   locating a target region in said image that may contain the image of a face;
   comparing said target region of said image to at least one identification template; and
   determining if said target region significantly matches said at least one identification template, wherein said step of locating said target region includes identifying an upper boundary, side boundaries and a lower boundary of said target region and wherein the step of identifying said upper boundary comprises comparing pixel blocks contained in rows of said final interest image with a threshold number value and identifying the first row wherein said threshold number value is exceeded, wherein the step of identifying said side boundaries comprises determining a first median column position of pixel blocks contained within rows of said final interest image indicative of said image horizontal start position and a second median column position of pixel blocks contained within rows of said final interest image indicative of said image horizontal end position, and wherein the step of identifying said lower boundary comprises averaging the numbers of pixel blocks contained in each row within said target region and identifying a row with a number of pixel blocks below average.

5. The method according to claim 4, wherein said step of producing an image comprises viewing said scene with a video camera, whereby said image is an electronic image produced by said video camera.

6. The method according to claim 4, further comprising the steps of normalizing said reduced resolution image with a y-gradient to produce a normalized y-gradient image.

7. The method according to claim 6, further comprising the step of performing a comparison between said x-gradient image and said y-gradient image to produce said normalized image.

8. The method according to claim 4, wherein said step of comparing said target region comprises the substep of providing said at least one identification template with a score indicative of how well said at least one identification template matches said target region.

9. The method according to claim 8, wherein said step of determining if said target region significantly matches said at least one identification template comprises comparing said score to a threshold score.

10. The method according to claim 4, further comprising the step of resizing said target region to a standard size that matches the size of said at least one identification template.

11. The method according to claim 4, further comprising the step of normalizing said target region for variations in lighting to produce a trinary image indicative of said final interest image for comparison with said identification templates.

12. The method according to claim 4, further comprising the step of searching said target region for the presence of an eye in said target region if said target region matches said at least identification template by a predetermined degree.

* * * * *